United States Patent
Horowitz et al.

(10) Patent No.: US 12,174,750 B2
(45) Date of Patent: Dec. 24, 2024

(54) VALIDATING ADDRESS SPACE CONTEXT SWITCHES BY LOADING AN ALTERNATIVE ADDRESS SPACE FROM AN ADDRESS TRANSLATION INDEPENDENT LOCATION

(71) Applicant: INTERNATIONAL BUSINESS MACHINES CORPORATION, Armonk, NY (US)

(72) Inventors: Idan Horowitz, Haifa (IL); Tom Kolan, Haifa (IL); Hillel Mendelson, Geln Iris (AU); Eliran Roffe, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/987,517

(22) Filed: Nov. 15, 2022

(65) Prior Publication Data
US 2024/0160578 A1 May 16, 2024

(51) Int. Cl.
*G06F 12/00* (2006.01)
*G06F 9/30* (2018.01)
(Continued)

(52) U.S. Cl.
CPC ........ *G06F 12/1027* (2013.01); *G06F 9/3004* (2013.01); *G06F 12/0238* (2013.01); *G06F 2212/7201* (2013.01)

(58) Field of Classification Search
CPC ............. G06F 12/1027; G06F 12/0238; G06F 9/3004; G06F 9/461; G06F 2212/7201
See application file for complete search history.

(56) References Cited

U.S. PATENT DOCUMENTS

| 11,138,126 B2 | 10/2021 | Nagarajan |
| 11,200,126 B2 | 12/2021 | Kolan et al. |

(Continued)

FOREIGN PATENT DOCUMENTS

| WO | 2021114171 A1 | 6/2021 |
| WO | 2021174233 A2 | 9/2021 |

OTHER PUBLICATIONS

Adir et al., Threadmill: A Post-Silicon Exerciser for Multi-Threaded Processors, IEEE, 2011 48th ACM/EDAC/IEEE Design Automation Conference (DAC), Date Added to IEEE Xplore: Aug. 11, 2011, 6 pages.

(Continued)

*Primary Examiner* — Shawn X Gu
(74) *Attorney, Agent, or Firm* — Yuanmin Cai

(57) ABSTRACT

A method for performing an address translation context switch includes initializing a computer processor to a first context by storing information identifying the first context in a control register of the computer processor. The first context specifies a mapping of virtual addresses of instructions to physical memory addresses in a first memory area. Information identifying a second context is stored in a memory address translation independent storage, where the second context specifies mapping of virtual addresses of instructions to physical memory addresses in a second memory area. The information identifying the second context is written to the control register of the computer processor.

20 Claims, 4 Drawing Sheets

(51) Int. Cl.
    *G06F 12/02*       (2006.01)
    *G06F 12/1027*    (2016.01)

(56) References Cited

U.S. PATENT DOCUMENTS

| | | |
|---|---|---|
| 11,263,150 B2 | 3/2022 | Mendelson et al. |
| 2013/0227704 A1* | 8/2013 | Boivie .................. G06F 21/54 |
| | | 726/27 |
| 2014/0320946 A1 | 10/2014 | Tomkins et al. |
| 2019/0220417 A1 | 7/2019 | Williamson et al. |
| 2019/0370055 A1 | 12/2019 | Gschwind et al. |
| 2020/0298678 A1 | 9/2020 | Katsura |
| 2021/0318559 A1 | 10/2021 | Liu et al. |

OTHER PUBLICATIONS

Joel Storm, Random Test Generators for Microprocessor Design Validation, Sun Microsystems Inc., 8th EMICRO, dated May 12, 2006, 59 pages.

* cited by examiner

VALIDATING ADDRESS SPACE CONTEXT SWITCHES BY LOADING AN ALTERNATIVE ADDRESS SPACE FROM AN ADDRESS TRANSLATION INDEPENDENT LOCATION

BACKGROUND

Field of the Invention

The field of the invention is data processing, or, more specifically, methods, apparatus, and products for validating context switches for memory address mapping.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

When implementing a computer system, hardware functional verification is performed for different components of the computer system. Constrained test generation is used to test different hardware components of a computer system, such as a computer processor. For example, a program is executed on a device under test, such as a computer processor, to generate test cases, execute the test cases, and verify results of the test cases to evaluate hardware functionality.

When testing a computer processor, context switches where virtual memory addresses are mapped to different physical memory addresses allow evaluation of multiple components of the computer processor. In a context switch, modifying from one translation context between a virtual memory address and a physical memory address to a different translation context between the virtual memory address and a different physical memory address involves invalidating multiple translation paths in the computer processor to implement a different translation context. Conventionally, system calls are used to perform a context switch. However, system calls involve large number of memory accesses and instructions, so they are time-intensive to execute. Additionally, the large number of instructions comprising a system call generate data that is unrelated to a test case being evaluated, which increases difficulty in identifying errors in test cases implemented using system calls.

SUMMARY

Methods and systems for performing an address translation context switch includes initializing a computer processor are described in this specification. Performing the address translation context switch includes storing information identifying the first context in a control register of the computer processor. The first context specifies a mapping of virtual addresses of instructions to physical memory addresses in a first memory area. Information identifying a second context is stored in a memory address translation independent storage, where the second context specifies mapping of virtual addresses of instructions to physical memory addresses in a second memory area. The information identifying the second context is written to the control register of the computer processor.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
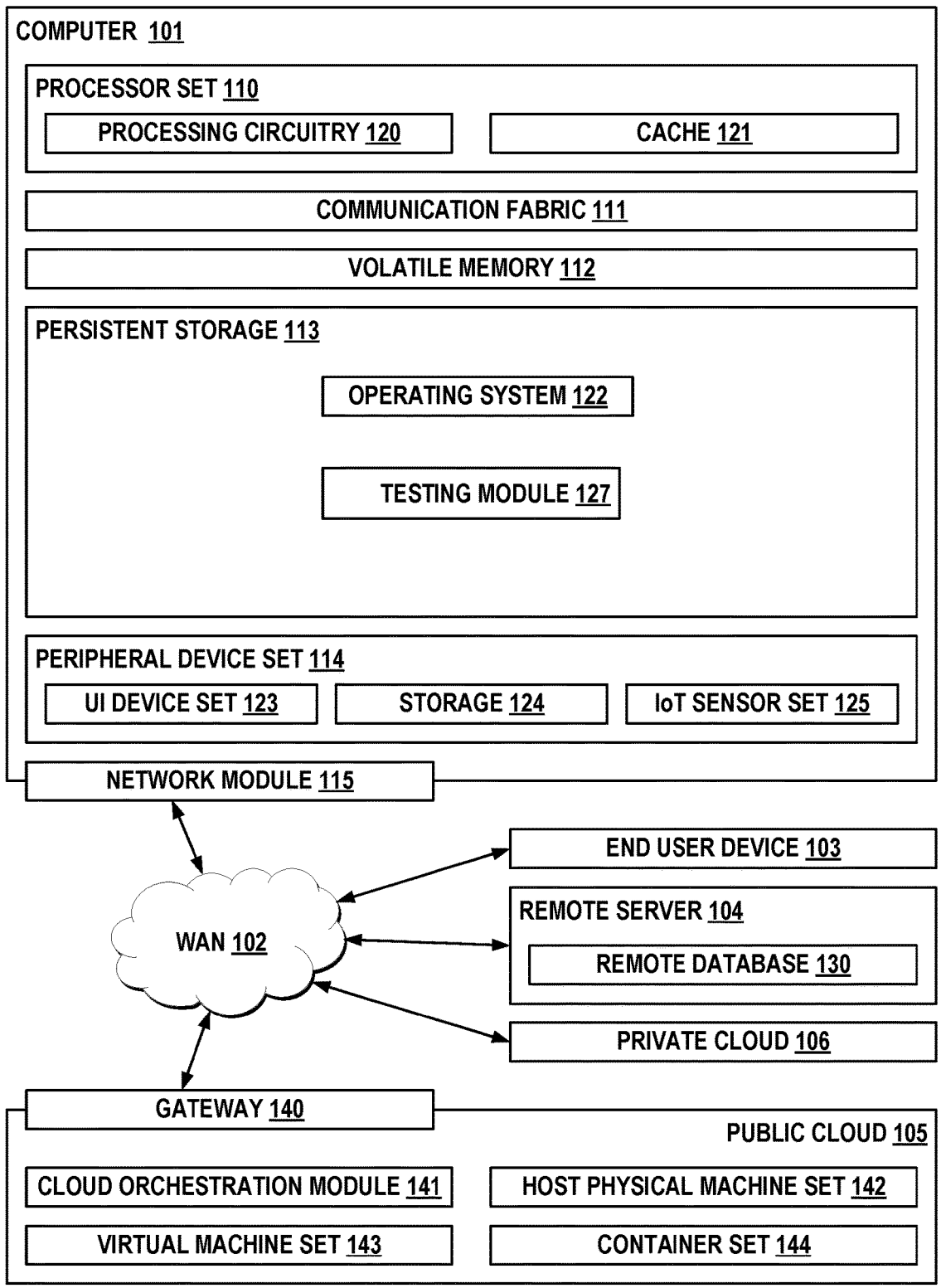
FIG. 1 is a block diagram of an example computing environment, according to some embodiments of the present disclosure.

Computing environment 100 shown in FIG. 1 contains an example of an environment for the execution of at least some of the computer code involved in performing the inventive methods, such as testing module 127. In addition to testing module 127, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and testing module 127, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Computing environment 100 contains an example of an environment for the execution of at least some of the computer code involved in performing the inventive methods, such as the testing module 127. The testing module 127 includes instructions and data for simulating operation of devices, such as a computer processor. The instructions included in the testing module 127 correspond to various operating tasks or functions of a device, and the testing tool 127 provides instructions to the device (e.g., to a computer processor) to test or to evaluate capability of the device to perform different operating tasks or functions. In addition to testing module 127, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and testing module 127, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
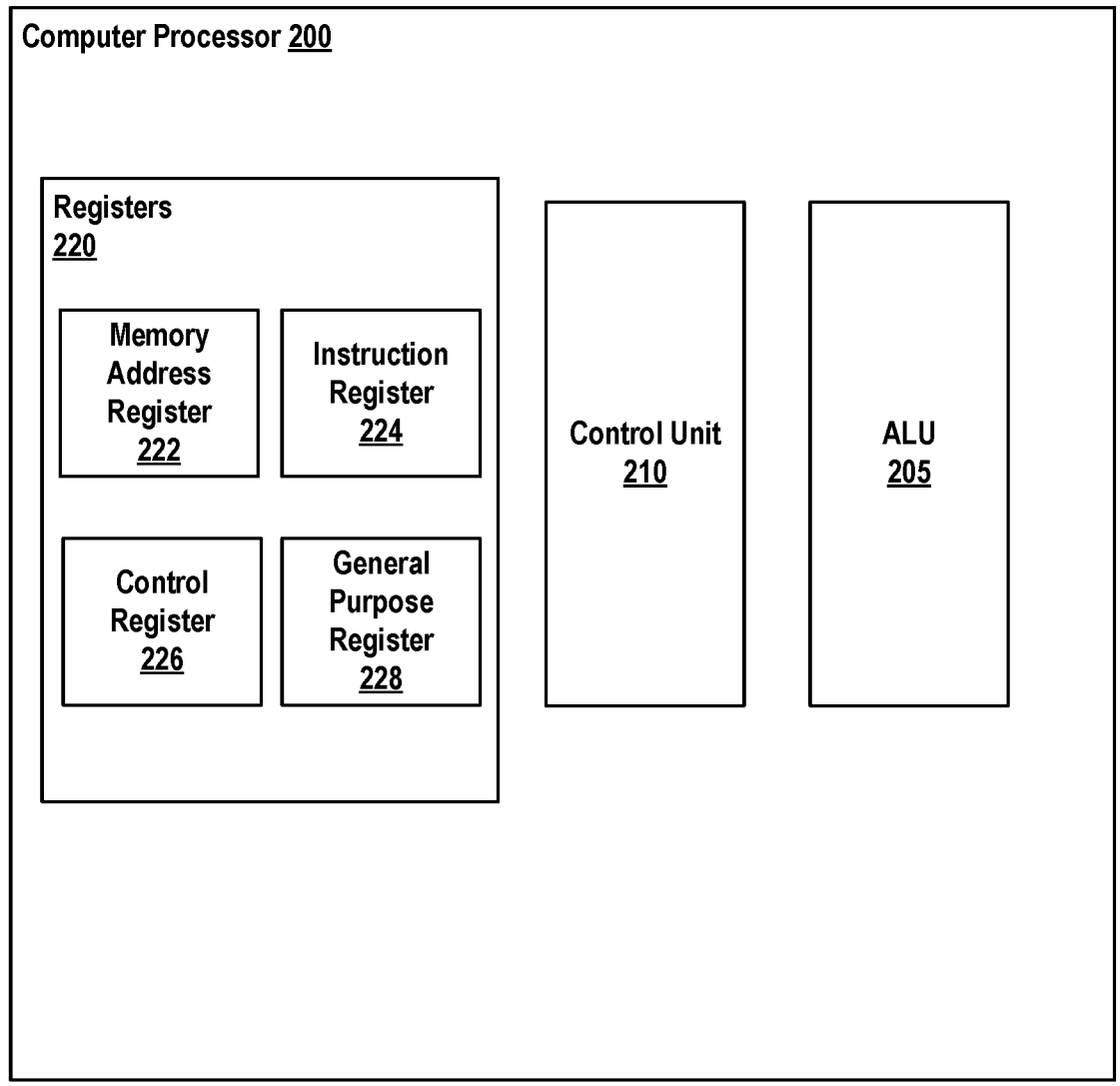
FIG. 2 is a block diagram of a computer processor, according to some embodiments of the present disclosure.

FIG. 2 is a block diagram of an example architecture of a computer processor 200. The computer processor 200 is included in processor set 110 of the computer 101 shown in FIG. 1 in various embodiments. In the example shown by FIG. 2, the computer processor 200 includes an arithmetic logic unit (ALU) 205, a control unit 210, and registers 220. In other embodiments, the computer processor 200 includes additional components than those described in conjunction with FIG. 2.

The ALU 205 comprises circuitry for performing arithmetic and logic operations. In various embodiments, the ALU 205 receives commands from the control unit 210 and executes the commands. One or more results from the ALU 205 are stored in a memory, such as the volatile memory 112 or the persistent storage 113 shown in FIG. 1. The control unit 210 retrieves an instruction from a memory or from a register 220 and decodes the retrieved instruction into one or more commands. The commands are transmitted from the control unit 210 to the ALU 205, which executes the commands. The ALU 205 stores one or more results of an executed command a memory or to a register 220.

In the example shown by FIG. 2, the computer processor 200 includes multiple registers 220. Each register 220 is a storage device included in the computer processor 200 and accessible by the ALU 205 or by the control unit 210. In various embodiments, the registers are high-speed storage areas. Different registers 220 have different functions in some embodiments, such as the example shown in FIG. 2. For example, different registers 220 include different data. In the example of FIG. 2, the computer processor 200 includes a memory address register 222, an instruction register 224, a memory data register 226, and a general purpose register 228. However, in other embodiments, different or additional registers 220 are included in the computer processor 200.

The memory address register 222 includes information identifying a location in memory 215 to be accessed. For example, the memory address register 222 includes a physical address in a memory, such as volatile memory 112, from which data is to be retrieved. In other examples, the address register 220 includes other information identifying a location within the memory to be accessed.

The instruction register 224 includes a current instruction being executed by the ALU 205. In various embodiments, the control unit 210 retrieves an instruction from a memory, such as volatile memory 112, and stores the instruction in the instruction register 224. The control unit 210 retrieves the instruction from the instruction register 224 and decodes the instruction into one or more commands that are provided to the ALU 205 for execution.

The control register 226 includes data that changes or controls one or more behaviors of the computer processor 200. For purposes of illustration, FIG. 2 shows a single control register 226, while in various embodiments, the computer processor includes multiple control registers 226. Example behaviors of the computer processor 200 modified or controlled by a control register 226 include interrupt control, paging control, and an addressing mode used by the computer processor 200. The addressing mode of the computer processor 200 defines how instructions executed by the computer processor 200 identify one or more corresponding operands. Similarly, an addressing mode specifies how the processor determines a physical memory address of an operand based on information stored in one or more control registers 226.

In various embodiments, the computer processor 200 includes other registers 220. For example, in some embodiments, the computer processor includes a memory data register that stores data being transferred from memory 215 or data being transferred to a memory. For example, the memory data register stores a result of an instruction executed by the ALU 205 before the result is stored in the memory. Similarly, the memory data register stores data retrieved from the memory for access by the ALU to execute one or more instructions.

As shown in FIG. 2, the computer processor 200 includes one or more general purpose registers 228. A general purpose register 228 stores data or a memory address. In various embodiments, a general purpose register 228 stores temporary data used by the computer processor 200 when executing one or more instructions. While FIG. 2 shows a single general purpose register 228 for purposes of illustration, in other embodiments, the computer processor 200 includes multiple general purpose registers 228. Different computer processors 200 may include different numbers of general purpose registers 228.

As shown in the example of FIG. 2, the computer processor 200 includes registers 220 having specific functions, such as the memory address register 222, the instruction register 224, and the model specific register 226, as well as one or more general purpose registers 228. In other embodiments, the computer processor 200 includes additional registers 220 having other specific functions. Further, in some embodiments, the computer processor 200 includes fewer specific registers than those depicted in FIG. 2.

The computer processor 200 is tested for functionality before inclusion in the computer 101 shown in FIG. 1. One or more tests performed on the computer processor 200 involve context switches. A context switch maps a virtual address from a physical address in a memory to a different physical address in the memory. Performing a context switch involves invalidating or clearing several translation paths cached by the computer processor 200 to map the virtual address to the different physical address in the memory. In conventional testing implementations, a system call is used to perform a context switch. A system call pauses execution of tasks in a first context, switches to a different context and executes tasks in the different context. Performing a system call involves executing a large number of instructions to save states of different components of the computer processor 200 in a first context to allow restoration of the first context, introducing additional data to the different components of the computer processor 200. This additional data decreases a likelihood of identifying errors the context switch caused to for different components. Further, executing a system call is time-intensive and cycle-intensive, having the computer processor 200 spend more cycles on performing the system call rather than evaluating components of the computer processor 200.

Figure 3:
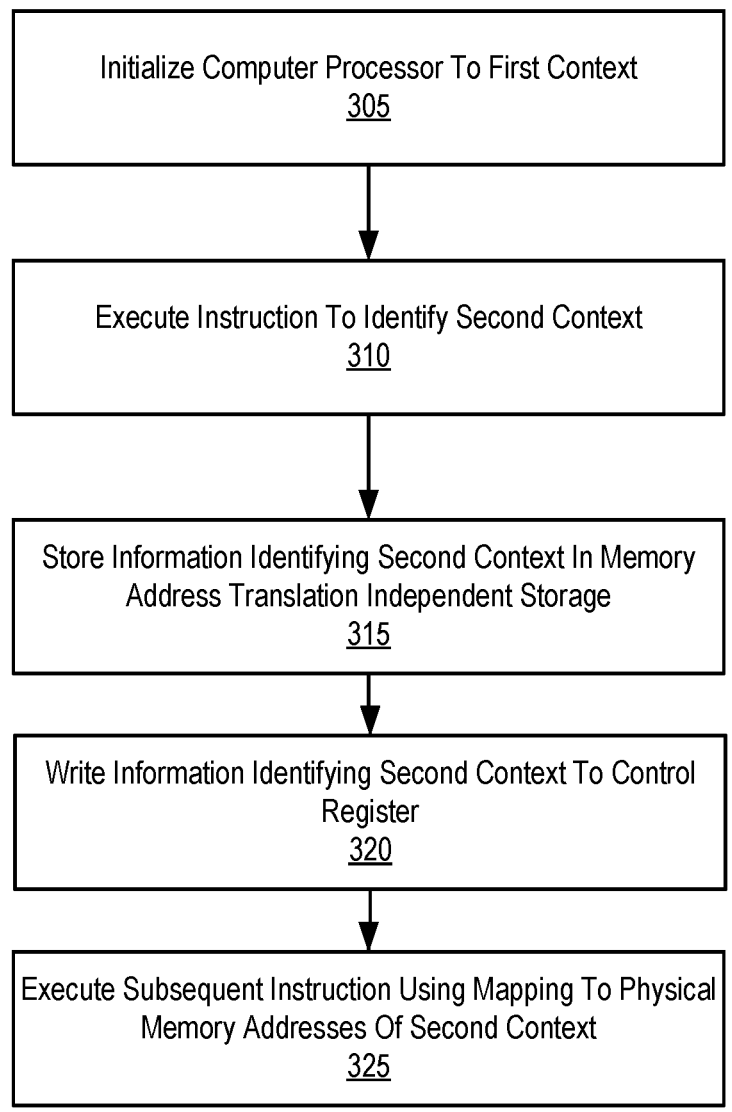
FIG. 3 is a flowchart of a method for testing a computer processor using a context switch by replacing an address translation context, according to some embodiments of the present disclosure.

FIG. 3 is a flowchart of one embodiment of a method for testing a computer processor 200 by performing a context switch by replacing an address translation context used by the computer processor 200 according to embodiments of the present disclosure. In contrast to conventional methods for implementing a context switch that use system calls, the method described in conjunction with FIG. 3 reduces a number of cycles for performing a context switch, and reduces an amount of additional data generated by performing the context switch.

The method initializes 305 a computer processor 200 to a first context. Initializing the computer processor to the first context stores information describing mapping of a virtual address to a physical memory address for the first context in the processor. For example, information identifying the first context and its mapping of a virtual address to a physical memory address for the first context is stored in a control register 226 of the computer processor 200. The information identifying the first context is an identifier of the first context in some embodiments. In other embodiments, the information identifying the first context is a base physical memory address corresponding to the first context. Additionally, during initialization, an executable memory area is allocated to the first context, the executable memory area allocated to the first context has a base virtual address to identify a start of the executable memory area allocated to the first context. In various embodiments, the method initializes 305 the computer processor 200 for by allocating an executable memory area that is mapped by a first context. The executable memory area is a region in a memory in which instructions comprising the first context are placed for retrieval and for subsequent execution. The first context maps a virtual address for an instruction to a physical memory address in the executable memory area. Different instructions in the executable memory area have different physical memory addresses in the executable memory area, with the first context mapping a virtual address for an instruction to a corresponding physical memory address using a mapping corresponding to the first context.

Figure 4:
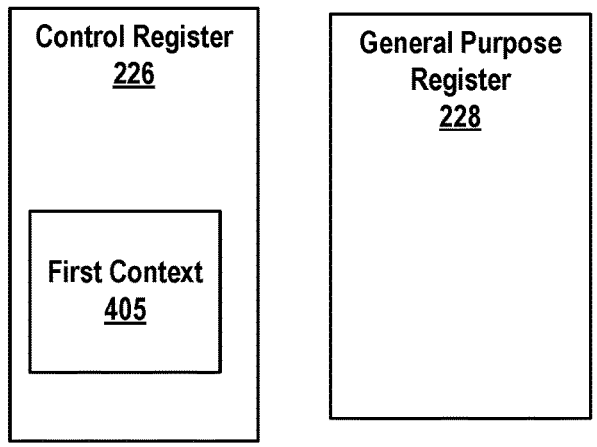
FIG. 4 is a block diagram of a subset of registers of a computer processor when initialized to a first context, according to some embodiments of the present disclosure.

FIG. 4 shows a block diagram of a subset of registers of the computer processor 200 when initialized 305 to the first context. For purposes of illustration, FIG. 4 shows data stored in a control register 226 and in a general purpose register 228 of the computer processor 200. When the computer processor 200 is initialized 305 to the first context, the control register 226 stores information identifying the first context 405. The stored information identifying the first context 405 allows the computer processor 200 to map virtual addresses for instructions to physical memory addresses corresponding to the first context 405.

Referring back to FIG. 3, with the computer processor 200 initialized 305 to the first context, the computer processor 200 executes instructions corresponding to the first context from the executable memory area allocated to the first context. In various embodiments, the computer processor 200 executes a set of instructions while initialized 305 to the first context. Instructions executed by the computer processor 200 while initialized to the first context load data from the executable memory area for the first context or store results of instructions to one or more locations in the executable memory area corresponding to physical memory addresses for the first context.

While initialized 305 to the first context, the computer processor 200 executes 310 an instruction that identifies the second context. Executing 310 the instruction causes the computer processor 200 to store 315 information identifying the second context in a memory address translation independent storage location. In some embodiments, the instruction includes a context identifier corresponding to the second context, and the computer processor 200 stores 315 the context identifier in a memory address translation independent storage location. As another example, the instruction includes an initial physical memory address of a second executable memory area corresponding to the second context. However, in other embodiments, other information identifying the second context is stored 315 in the memory address translation independent storage when the computer processor 200 executes 310 the instruction.

In some embodiments, the memory address translation independent storage is a general purpose register 228 of the computer processor 200. In other embodiments, the memory address translation independent storage is a region of memory having a physical memory address that is independent of address translation used by the computer processor 200. Hence, the memory address translation independent storage is a storage location where the information identifying the second context is stored in a fixed physical memory address that is accessible independent of a mapping of virtual addresses to physical memory addresses by a context.

Figure 5:
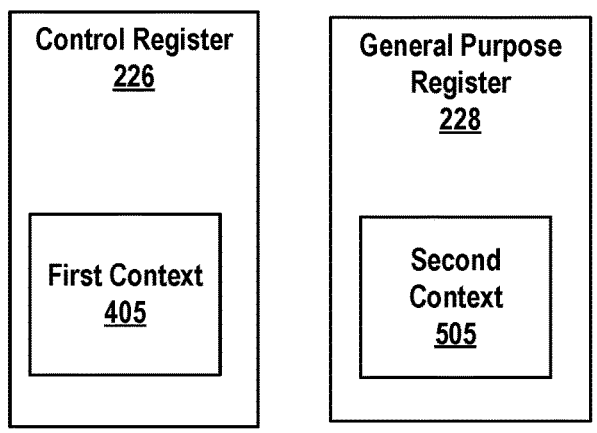
FIG. 5 is block diagram of a subset of registers of a computer processor when the information identifying the second context is stored in a general purpose register, according to some embodiments of the present disclosure.

Referring to FIG. 5, shows a block diagram of a subset of registers of the computer processor 200 when the information identifying the second context is stored 315. For purposes of illustration, FIG. 5 shows data stored in a control register 226 and in a general purpose register 228 of the computer processor 200. As shown in FIG. 5, the control register 226 stores information identifying the first context 405, while the general purpose register 228 is updated to store information identifying the second context 505. In the example of FIG. 5, the computer processor 200 remains operating in the first context 405, as the information identifying the first context 405 remains in the control register 226. However, in FIG. 5, information identifying the second context 505 is stored in the general purpose register 228 for subsequent retrieval. While FIG. 5 shows an example that stores the information identifying the second context 505 in a general purpose register 228, in other embodiments the information identifying the second context 505 is stored in another location that is capable of being retrieved from a specific location using a specific physical memory address independent of a context in which the computer processor 200 operates. For example, the information identifying the second context 505 is stored in a location within a memory accessible using a fixed address that is independent of a mapping of virtual addresses to physical memory addresses specified by a context.

Referring back to FIG. 3, with the information identifying the second context stored in the memory address translation independent location, the computer processor 200 writes 320 the information identifying the second context from the memory address translation independent location to the control register 226. In various embodiments, the information identifying the second context overwrite the previously stored information in the control register 226 identifying the first context. The computer processor 200 executes an instruction having a virtual address corresponding to an end of the first context to write 320 the information identifying the second context from the memory address translation independent location to the control register 226. The instruction executed 315 to write 320 the information identifying the second context from the memory address translation independent location to the control register 226 is determined based on an architecture of the computer processor 200 in various embodiments. For example, for a computer processor with a RISC-V (reduced instruction set computer five) architecture, the instruction writes 320 a specific value identifying the second context to the general purpose register 228. As another example, the instruction for a computer processor 200 with an ARM (advanced RISC machine) or x86 architecture writes a base physical memory address for a table mapping virtual addresses to physical memory addresses for the second context in the general purpose register 228. The virtual address of the instruction writing the information identifying the second context into the control register 226 is a final address of a set of instructions executed by the computer processor 200 in the first context.

Figure 6:
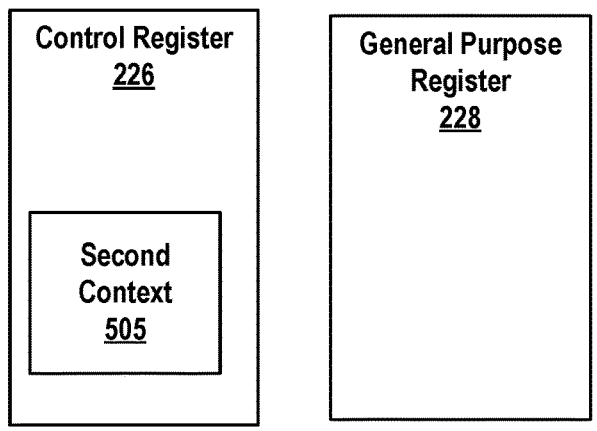
FIG. 6 is a block diagram of a subset of registers of a computer processor when the information identifying the second context is written to a control register, according to some embodiments of the present disclosure.

For purposes of illustration, FIG. 6 shows a block diagram of a subset of registers of the computer processor 200 when the information identifying the second context is written 320 to a control register 226. For purposes of illustration, FIG. 6 shows data stored in the control register 226 and in a general purpose register 228 of the computer processor 200. As shown in FIG. 6, the information identifying the second context 505 stored in the general purpose register 228 in FIG. 5 is written 320 to the control register 226 of the computer processor 200. With the information identifying the second context 505 stored in the control register 226, the computer processor maps virtual addresses for instructions to physical memory addresses based on a mapping specified by the second context.

As the control register 226 specifies the address translation from virtual addresses to physical memory addresses, writing 320 the information identifying the second context to the control register 226 causes the computer processor to execute 325 subsequent instructions using a mapping of virtual addresses to physical memory addresses specified by the second context. After writing 320 the information identifying the second context to the control register 226, the computer processor 200 operates in the second context and retrieves an instruction subsequent to writing 320 the information identifying the second context to the control register 226 from a virtual address corresponding to the second context. A virtual address for the instruction subsequent to writing 320 the information identifying the second context to the control register 226 is determined as the virtual address of the instruction writing the information identifying the second context into the control register 226 incremented by an instruction width for register write instructions. The instruction width is based on an architecture type of the computer processor 200.

In some embodiments, one or more instructions executed 325 subsequent to writing 320 the information identifying the second context to the control register 226 flush translation buffers or other caches that included mapping of virtual addresses to physical memory addresses in the first context. Execution of instructions to flush one or more caches after writing 320 the information identifying the second context to the control register 226 depends on an architecture of the computer processor 200. For certain architectures of the computer processor 200, instructions to clear the one or more caches are executed 325, while for other architectures of the computer processor 200, instructions to clear the one or more caches are not executed 325.

The virtual address of the subsequent instruction is mapped to a physical memory address specified by the second context, so the subsequent instruction is retrieved from an executable memory area allocated to the second context, rather than from the executable memory context allocated to the first context. The executable memory area allocated to the second context differs from the executable memory area allocated to the first context. In various embodiments, the executable memory area allocated to the second context is not contiguous with the executable memory area allocated to the first context. Similarly, instructions executed by the computer processor 200 after writing 320 the information identifying the second context to the control register 226 are retrieved from the executable memory area allocated to the second context based on a mapping of virtual addresses to physical memory addresses corresponding to the second context.

In various embodiments, the computer processor 200 executes a write instruction prior to executing 310 the instruction that identifies the second context, the write instruction has a specific virtual address. The write instruction stores data to a physical memory address that is determined from the mapping of virtual addresses to physical memory addresses by the first context, as the write operation is executed 210 prior to writing 320 the information identifying the second context to the control register 226. After writing 320 the information identifying the second context to the control register 226, the computer processor 200 executes an additional write instruction. The additional write instruction has the specific virtual address of the write instruction in some embodiments and stores alterative data to a physical memory address. The physical memory address for the alternative data is based on mapping of the virtual address to a physical memory address specified by the second context. As the additional write instruction is executed 325 after the information identifying the second context is written 320 to the control register 226, the mapping of virtual addresses to physical memory addresses for the additional write instruction is specified by the second context. Having both the write instruction and the additional write instruction share the specific virtual address allows the context switch to be verified by comparing the data stored in memory. If the additional write instruction did not overwrite the data from the write instruction stored in memory, the context switch was performed. If the data from the write instruction executed during the first context was not overwritten by the alternative data from the additional write instruction, the mapping of virtual address to physical memory address by the second context was performed when the additional write instruction was executed 325, indicating the context switch from the first context to the second context occurred.

In various embodiments, after executing 325 one or more instructions while the information identifying the second context is stored 320 in the control register 226, the computer processor executes an instruction to initialize the computer processor 200 back to the first context. For example, an instruction is a jump to register instruction that identifies a register, such as a link register, storing a physical memory address. Subsequently, identifying the base virtual address for the executable instruction area allocated to the first context, which causes execution of the steps of the method further described in conjunction with FIG. 3, allowing a context switch from the first context to the second context to again be performed.

Performing a context switch by loading information identifying a different context into a memory address translation independent storage and writing the information identifying the different context into a control register reduces a number of cycles consumed to perform the context switch. Additionally, loading information identifying a different context into a memory address translation independent storage and writing the information identifying the different context into a control register reduces a number of instructions executed to perform a context switch. Executing a reduced number of instructions simplifies identification of potential errors in performing the context switch by reducing a number of instructions that are evaluated to assess the context switch. In addition to expediting identification of potential errors, the reduced number of instructions to perform the context switch allows errors that would be hidden by cache clearing operations of system calls when performing conventional context switches to be identified, providing greater insight into potential context switching errors.

Exemplary embodiments of the present invention are described largely in the context of a fully functional computer system for performing a context switch by replacing an address translation context used by the computer processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performing an address translation context switch by a computer processor, the method comprising:
    initializing the computer processor to a first context by storing information identifying the first context in a control register of the computer processor, the first context specifying mapping of virtual addresses of instructions to physical memory addresses in a first memory area;
    storing information identifying a second context in a memory address translation independent storage using a mapping between a virtual address of a write instruction and a physical memory address specified by the first context, the second context specifying mapping of virtual addresses of instructions to physical memory addresses in a second memory area; and
    writing the information identifying the second context to the control register of the computer processor.

2. The method of claim 1, further comprising:
    executing one or more instructions using the second context after writing the information identifying the second context to the control register of the computer processor.

3. The method of claim 2, wherein executing one or more instructions using the second context after writing the information identifying the second context to the control register of the computer processor comprises:
    retrieving an instruction from a virtual address of the second context; and
    translating the virtual address of the second context to a physical memory address using the mapping specified by the second context.

4. The method of claim 1, wherein storing the information identifying the second context in the memory address translation independent storage comprises:
    executing the write instruction having the virtual address, the write instruction storing data to memory using the mapping between the virtual address and the physical memory address specified by the first context; and
    after executing the write instruction, storing the information identifying the second context in the memory address translation independent storage.

5. The method of claim 4, wherein executing one or more instructions using the second context after writing the information identifying the second context to the control register of the computer processor comprises:
    executing an additional write instruction having the virtual address, the additional write instruction storing alternative data to memory using a mapping between the virtual address and a physical memory address specified by the second context.

6. The method of claim 1, wherein the memory address translation independent storage comprises a general purpose register of the computer processor.

7. The method of claim 1, wherein the memory address translation independent storage comprises a region of memory having a physical memory address that is independent of address translation used by the computer processor.

8. An apparatus for performing an address translation context switch, the apparatus comprising a computer processor, a computer memory operatively coupled to the computer processor, the computer memory having disposed within it computer program instructions that, when executed by the computer processor, cause the apparatus to carry out steps of:
    initializing the computer processor to a first context by storing information identifying the first context in a control register of the computer processor, the first context specifying mapping of virtual addresses of instructions to physical memory addresses in a first memory area;
    storing information identifying a second context in a memory address translation independent storage using a mapping between a virtual address of a write instruction and a physical memory address specified by the first context, the second context specifying mapping of virtual addresses of instructions to physical memory addresses in a second memory area; and
    writing the information identifying the second context to the control register of the computer processor.

9. The apparatus of claim 8, further comprising:
executing one or more instructions using the second context after writing the information identifying the second context to the control register of the computer processor.

10. The apparatus of claim 9, wherein executing one or more instructions using the second context after writing the information identifying the second context to the control register of the computer processor comprises:
retrieving an instruction from a virtual address of the second context; and
translating the virtual address of the second context to a physical memory address using the mapping specified by the second context.

11. The apparatus of claim 9, wherein storing the information identifying the second context in the memory address translation independent storage comprises:
executing the write instruction having the virtual address, the write instruction storing data to memory using the mapping between the virtual address and the physical memory address specified by the first context; and
after executing the write instruction, storing the information identifying the second context in the memory address translation independent storage.

12. The apparatus of claim 11, wherein executing one or more instructions using the second context after writing the information identifying the second context to the control register of the computer processor comprises:
executing an additional write instruction having the virtual address, the additional write instruction storing alternative data to memory using a mapping between the virtual address and a physical memory address specified by the second context.

13. The apparatus of claim 8, wherein the memory address translation independent storage comprises a general purpose register of the computer processor.

14. A computer program product for performing an address translation context switch, the computer program product disposed upon a computer readable storage medium, the computer program product comprising computer program instructions that, when executed, cause a computer to carry out steps of:
initializing a computer processor to a first context by storing information identifying the first context in a control register of the computer processor, the first context specifying mapping of virtual addresses of instructions to physical memory addresses in a first memory area;
storing information identifying a second context in a memory address translation independent storage using a mapping between a virtual address of a write instruction and a physical memory address specified by the first context, the second context specifying mapping of virtual addresses of instructions to physical memory addresses in a second memory area; and
writing the information identifying the second context to the control register of the computer processor.

15. The computer program product of claim 14, wherein the computer program instructions, when executed, further cause the computer to carry out steps of:
executing one or more instructions using the second context after writing the information identifying the second context to the control register of the computer processor.

16. The computer program product of claim 15, wherein executing one or more instructions using the second context after writing the information identifying the second context to the control register of the computer processor comprises:
retrieving an instruction from a virtual address of the second context; and
translating the virtual address of the second context to a physical memory address using the mapping specified by the second context.

17. The computer program product of claim 15, wherein storing the information identifying the second context in the memory address translation independent storage comprises:
executing the write instruction having the virtual address, the write instruction storing data to memory using the mapping between the virtual address and the physical memory address specified by the first context; and
after executing the write instruction, storing the information identifying the second context in the memory address translation independent storage.

18. The computer program product of claim 17, wherein executing one or more instructions using the second context after writing the information identifying the second context to the control register of the computer processor comprises:
executing an additional write instruction having the virtual address, the additional write instruction storing alternative data to memory using a mapping between the virtual address and a physical memory address specified by the second context.

19. The computer program product of claim 14, wherein the memory address translation independent storage comprises a general purpose register of the computer processor.

20. The computer program product of claim 14, wherein the memory address translation independent storage comprises a region of memory having a physical memory address that is independent of address translation used by the computer processor.

* * * * *